UNITED STATES PATENT OFFICE 2,445,627

MONOMERIC AND POLYMERIC UNSATURATED ESTERS AND THEIR PRODUCTION

Rupert C. Morris and Robert M. Horowitz, Berkeley, and Alva V. Snider, Richmond, Calif., assignors to Shell Development Company, San Francisco, Calif., a corporation of Delaware No Drawing. Application September 19, 1944, Serial No. 554,860

4 Claims. (Cl. 260—468)

This invention relates to monomeric and polymeric unsaturated esters, and to methods for their production. More particularly, the invention pertains to the monomeric and polymeric allyl type esters of the monomethyl and dimethyl-substituted 1,2,3,6-tetrahydrophthalic acids and to methods for the production of the said monomeric and polymeric allyl-type esters.

Diallyl 1,2,3,6-tetrahydrophthalate is a known compound. The compounds of the present invention are distinguishable from this compound in that one or two methyl groups are substituted upon carbon atoms of the tetrahydrophthalic acid nucleus. It has been found that this variation in structure gives to the compounds of the invention inherent properties which are unexpectedly quite different from those of the said diallyl 1,2,3,6-tetrahydrophthalate. These properties could not be foreseen and they are of such a nature as to make the esters of the invention superior in many respects to diallyl 1,2,3,6-tetrahydrophthalate, and particularly useful in various applications.

Thus, polymerization of diallyl 1,2,3,6-tetrahydrophthalate leads to the formation of a polymer which is a deep yellow solid material. It would be expected that polymerization of the higher homologs, e. g. the methyl homologs, of this compound would lead to the formation of a polymer which is more easily prepared in a solid condition and which is harder than the polymer of the aforesaid known compound. Such, however, is not the case. It has been found that polymers of the allyl methyl-substituted 1,2,3,6-tetrahydrophthalates, wherein the methyl substituents are substituted upon nuclear carbon atoms, may be prepared only in the form of heavy viscous syrups which do not solidify to form a hard solid polymer even upon prolonged heating with excess amounts of polymerization catalysts such as benzoyl peroxide. The polymers, though fluid in nature, are of good color. They may therefore be used in applications which take advantage of their fluid nature, i. e. in applications for which the polymeric diallyl 1,2,3,6-tetrahydrophthalate is not well suited. For example, when the polymers of the esters of the invention are dissolved in a suitable solvent, e. g. an aromatic hydrocarbon solvent such as benzene, a solution is formed which air-dries under the proper conditions to form a hard, clear film. The herein disclosed polymeric esters are therefore useful and superior constituents of baking enamels, varnishes, cements, and adhesive materials for laminating various products such as wood products.

Because of the methyl substituents upon the ring structure, the polymers of the esters of the invention are uniquely soluble in a variety of organic compounds and compositions. Since they are readily soluble in high molecular weight hydrocarbons, they may be advantageously added to lubricating oils for the purpose of increasing the viscosity index of the said lubricating oils. They are also readily miscible with other polymeric substances, particularly with various types of synthetic rubbers. They may therefore be used as plasticizers and as additional components in such polymeric products. The monomeric ester is highly toxic to insects and is useful as an insecticide or as a component of insecticidal compositions. Other uses for the esters of the invention comprise their use as light stabilizers for resins of the vinylidene chloride type, as textile assistants, and as intermediates in the synthesis of other valuable organic compounds.

The compounds of the invention comprise the mono and diallyl type esters of the mono and dimethyl - substituted 1,2,3,6 - tetrahydrophthalic acids. These esters have the general formula

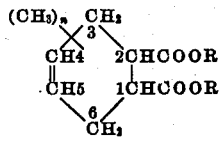

wherein at least one R represents an allyl type group and wherein $n$ is either 1 or 2. The methyl groups may be substituted upon any of the nuclear carbon atoms, i. e. upon the carbon atoms which are numbered 1, 2, 3, 4, 5 or 6 provided that not more than two methyl groups are substituted thereon. These compounds may also be named the allyl type esters of the mono and dimethyl substituted $\Delta^4$ tetrahydrophthalic acids or the allyl type esters of the mono and dimethyl-substituted 1,2,3,6-tetrahydro-4-cyclohexene-1,2-dicarboxylic acids.

As stated, R in the general formula given hereinabove represents an allyl-type unsaturated group which may be derived from an unsaturated alcohol, i. e. an alcohol which has a double bond of aliphatic character between two carbon atoms, one of which is directly attached to a saturated carbinol atom. Such alcohols have an atomic grouping which may be represented by the general formula

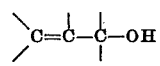

Examples of such allyl-type groups are the allyl, methallyl, ethallyl, chloroallyl, bromoallyl, methoxyallyl, ethoxyallyl, cyanoallyl, hydroxyallyl, crotyl, tiglyl, cinnamyl, methylvinylcarbinyl, ethylvinylcarbinyl, n-propylvinylcarbinyl, isopropylvinylcarbinyl, dimethylvinylcarbinyl, methylethylvinylcarbinyl, etc. groups. Preferred allyl type radicals are the allyl, methallyl and crotyl radicals.

The other R group in the above general formula may be an allyl-type group, for example an allyl group of the type set forth in the above examples. It may also be any other type of unsaturated group such as a vinyl-type group as, for example, a vinyl, isopropenyl, isobutenyl, cyclohexenyl, etc., or an acetylenic group such as the propargyl group. The second R in the said formula may also be a saturated hydrocarbon group. Thus, it may be an alkyl group such as a methyl, ethyl, n-propyl, i-propyl, n-butyl, sec-butyl, i-butyl, amyl, hexyl, heptyl, or octyl group. It may also be a group of cycloaliphatic character, e. g. a cyclopentyl, methylcyclopentyl, cyclohexyl, or methylcyclohexyl group, or an aromatic group, e. g. a phenyl, tolyl, or xylyl group. Any of the aforementioned hydrocarbon groups may be substituted with suitable substituent atoms or groups, e. g. a halogen atom, such as a chlorine or bromine atom, a hydroxyl group, an alkoxy group, e. g. a methoxy group, a keto group, a cyano group, an amino group, etc.

Compounds which are representative of the compounds of the invention are, therefore, monomeric and polymeric:

Diallyl-1-methyl-1,2,3,6-tetrahydrophthalate
Diallyl-3-methyl-1,2,3,6-tetrahydrophthalate
Diallyl-4-methyl-1,2,3,6-tetrahydrophthalate
Diallyl-1,2-dimethyl-1,2,3,6-tetrahydrophthalate
Diallyl-1,3-dimethyl-1,2,3,6-tetrahydrophthalate
Diallyl-1,4-dimethyl-1,2,3,6-tetrahydrophthalate
Diallyl-2,3-dimethyl-1,2,3,6-tetrahydrophthalate
Diallyl-2,4-dimethyl-1,2,3,6-tetrahydrophthalate
Diallyl-3,4-dimethyl-1,2,3,6-tetrahydrophthalate
Diallyl-3,5-dimethyl-1,2,3,6-tetrahydrophthalate
Diallyl-4,5-dimethyl-1,2,3,6-tetrahydrophthalate
Diallyl-3,6-dimethyl-1,2,3,6-tetrahydrophthalate
Allylmethallyl-3,5-dimethyl- 1,2,3,6 - tetrahydrophthalate
Allylmethallyl-4,5-dimethyl- 1,2,3,6 - tetrahydrophthalate
Dimethallyl-3-methyl-1,2,3,6 - tetrahydrophthalate
Dimethallyl-4-methyl-1,2,3,6 - tetrahydrophthalate
Dimethallyl-4,5 - dimethyl - 1,2,3,6 - tetrahydrophthalate
Dimethallyl-3,5 - dimethyl - 1,2,3,6 - tetrahydrophthalate
Allylcrotyl-3-methyl-1,2,3,6-tetrahydrophthalate
Allylcrotyl - 3,5 - dimethyl - 1,2,3,6 - tetrahydrophthalate
Allylcinnamyl - 3 - methyl - 1,2,3,6 - tetrahydrophthalate
Allylethallyl-3,5 - dimethyl - 1,2,3,6 - tetrahydrophthalate
Monoallyl-3-methyl-1,2,3,6-tetrahydrophthalate
Monoallyl-4-methyl-1,2,3,6-tetrahydrophthalate
Monoallyl - 4,5 - dimethyl - 1,2,3,6 - tetrahydrophthalate
Monoallyl - 3,5 - dimethyl - 1,2,3,6 - tetrahydrophthalate
Monomethallyl- 3 - methyl - 1,2,3,6 - tetrahydrophthalate
Monomethallyl-3,5-dimethyl-1,2,3,6 - tetrahydrophthalate, etc Preferred esters are those wherein the ester group or groups contain not more than 4 carbon atoms.

The novel compounds of the invention may be prepared by any method suited or adapted to the preparation of compounds of the described structural type. They may be readily prepared, for example, by the direct esterification of the methyl - substituted 1,2,3,6 - tetrahydrophthalic acids or their anhydrides. The said anhydrides may be readily prepared by a Diels-Alder reaction, using as starting materials a suitable straight chain conjugated diene and maleic anhydride. When 2-methyl-pentadiene-1,3 is used as a representative conjugated diene, the reactions which may be employed to synthesize the methyl-substituted tetrahydrophthalic acid anhydride and to effect the esterification of the said anhydride using allyl alcohol as a representative unsaturated alcohol may be illustrated by the following equations:

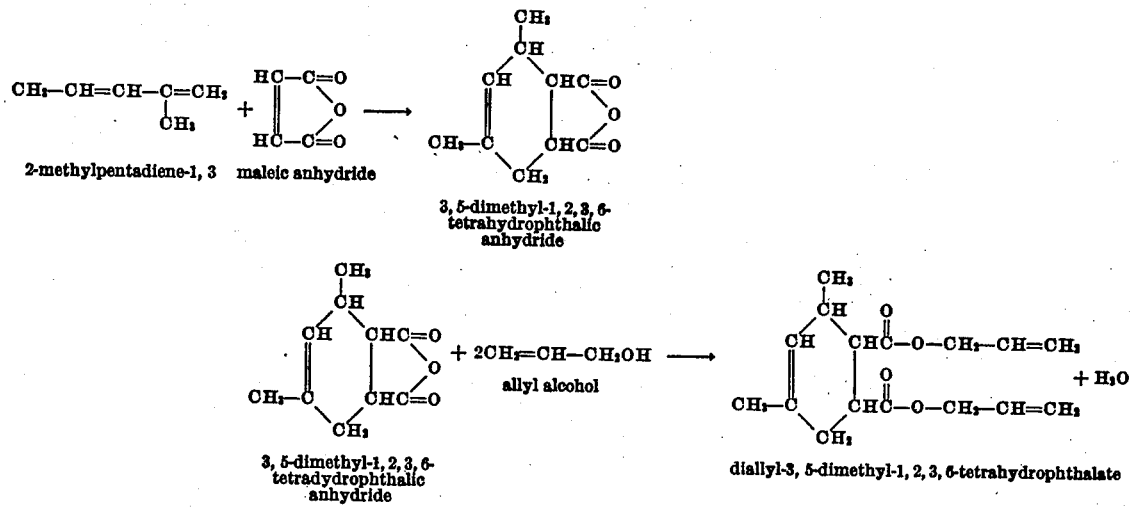

Allylmethallyl - 3 - methyl - 1,2,3,6 - tetrahydrophthalate
Allylisopropenyl-3 - methyl - 1,2,3,6 - tetrahydrophthalate
Allylmethallyl - 4 - methyl - 1,2,3,6 - tetrahydrophthalate This method may be applied to the production of methyl-substituted 1,2,3,6-tetrahydrophthalic acid allyl type esters from such conjugated dienes as 2 - methylbutadiene - 1,3, 2,3 - dimethylbutadiene-1,3, pentadiene-1,3, 2-methylpentadiene-1,3, and 3-methylpentadiene-1,3. When it is desired to prepare compounds having the methyl groups substituted upon the number 1 or the number 2 carbon atom of the ring structure, methyl maleic anhydride or dimethyl maleic anhydride may be employed in the synthesis in place of maleic anhydride.

Representative unsaturated alcohols which may be employed in the esterification step comprise allyl alcohol, methallyl alcohol, 2-methyl-3-ethyl allyl alcohol, 2-ethyl-3-propyl allyl alcohol, methyl vinyl carbinol, ethallyl alcohol, chloroallyl alcohol, buten-1-ol-3, penten-1-ol-3, hexen-1-ol-3, 3-methyl-buten-1-ol-3, 3-methyl-penten-1-ol-3, 2-methyl-buten-1-ol-3, 2-methyl-penten-1-ol-3, 2,3-dimethyl-buten-1-ol-3, 4-methyl-hepten-1-ol-3, 4-methyl-hexen-1-ol-3, 5-methyl-hexen-1-ol-3, 4,4'-dimethyl-penten-1-ol-3, octen-1-ol-3, 6-methyl-hepten-1-ol-3, 4-methyl-hepten-1-ol-3, 4,4'-dimethyl-hexen-1-ol-3, 3-phenyl-propen-1-ol-3, 3-tolyl-propen-1-ol-3, 3-xylyl-propen-1-ol-3, 4-phenyl-buten-1-ol-3, 4-tolyl-buten-1-ol-3, 4-xylyl-buten-1-ol-3, 3-naphthyl-propen-1-ol-3, 4-chloro-buten-1-ol-3, pentadien-1,4-ol-3, hexen-1-yn-5-ol-3, 2-methyl-penten-1-yn-4-ol-3, and 2,5-dimethyl-hexadien-1,5-ol-4. Other allyl-type alcohols are crotyl alcohol, tiglyl alcohol, 3-chloro-buten-2-ol-1, cinnamyl alcohol, hexadien-2,4-ol-1, hexadien-2,5-ol-1, butadien-2,3-ol-1, hexadien-3,5-ol-2, 2-methyl-hexen-2-ol-1, 2-methyl-penten-2-ol-1, 3,7-dimethyl-octadien-2,7-ol-1, cyclopenten-2-ol-1, cyclohexen-2-ol-1, etc. Preferred allyl type alcohols are allyl alcohol, methallyl alcohol, and crotyl alcohol.

The first of the above two reactions for the preparation of the esters of the invention, i. e. the production of the methyl-substituted tetrahydrophthalic anhydrides, may be readily carried out by heating a mixture of approximately equimolecular proportions of a maleic anhydride and a conjugated straight chain diene at a temperature sufficiently elevated to effect the addition of the olefin to the diolefin, thereby forming the desired cyclic anhydride. The reaction may be carried out, if desired, in the presence of a suitable solvent such as an aromatic hydrocarbon solvent, e. g. benzene. The adduct may be separated from the reaction mixture by any desired means, it being usually preferred to effect its separation by fractional distillation of the reaction product at subatmospheric pressure. The reaction temperature employed is variable depending upon the character of the starting materials employed and upon the other conditions of reaction, but may in general be between about 75° C. and about 125° C., preferably about 100° C. Somewhat higher temperatures may be employed, if desirable, however, as where the reaction is carried out at a superatmospheric pressure. The esterification of the anhydride prepared by the condensation of a maleic anhydride with a straight chain conjugated diene may be carried out by heating the said anhydride or the corresponding free acid with a suitable quantity of an allyl type alcohol, e. g. allyl alcohol. The amount of alcohol to be used is largely determined by whether it is desired to prepare the monoester or the diester. When it is desired to prepare the monoester, an amount of alcohol should be used which is approximately equivalent to the amount of anhydride it is desired to esterify. However, when the diester is to be prepared approximately two equivalents of alcohol should be used for each equivalent of the cyclic anhydride. The esterification reaction is preferably carried out in the presence of a suitable esterification catalyst. Suitable catalysts are the mineral acids such as sulfuric acid, hydrochloric acid, phosphoric acid, etc., or certain of the organic acids such as benzene sulfonic acid, paratoluene sulfonic acid and the like.

It is obvious that since the unsaturated alcohols which are employed to esterify the cyclic anhydrides or acids are capable of polymerization, as is the ester which is formed as a product of the reaction, the operating conditions must be regulated, when it is desired to prepare the monomeric ester, so as to favor the production of the monomer and to hinder the polymerization reactions. The esterification should therefore be carried out for relatively short operating periods and at temperatures which are not above those required to effect the desired reaction. It is also often advantageous to effect the reaction in the presence of a polymerization inhibitor such as tannic acid. The monomeric ester product may be separated from the esterification reaction mixture by dissolving in diutue sodium carbonate solution, or by other suitable means.

Since, as stated, the esterification of the methyl-substituted 1,2,3,6-tetrahydrophthalic acids or their anhydrides with an unsaturated alcohol may in some cases be attended by concurrent polymerization of the unsaturated alcohol and/or of the unsaturated ester product, thus causing the occurrence of undesirable side reactions and consequent loss of product, it may in these cases be desirable to prepare the methyl-substituted 1,2,3,6-tetrahydrophthalic acid esters of the invention by a process which does not require the direct esterification of the tetrahydrophthalic acid or of its anhydride with an unsaturated alcohol. This may be accomplished in a simple one-step reaction by reacting a conjugated diene, e. g. 2-methylpentadiene-1,3, with an allyl type ester of maleic acid and an unsaturated aliphatic alcohol. Thus, diallyl 3,5-dimethyl-1,2,3,6-tetrahydrophthalate may be prepared by the simple condensation of 2-methylpentadiene-1,3 with diallyl maleate:

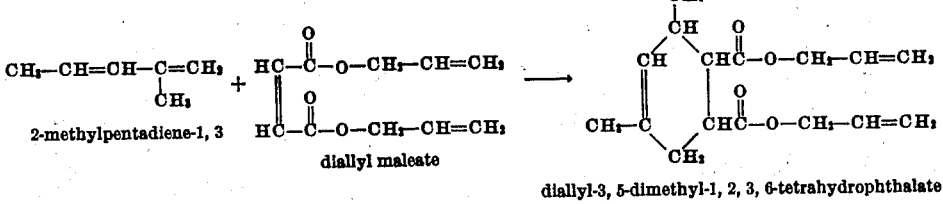

diallyl-3, 5-dimethyl-1, 2, 3, 6-tetrahydrophthalate

This reaction may be carried out using substantially the same conditions as employed in the hereinabove outlined procedure for reacting 2-methylpentadiene-1,3 with maleic anhydride. It may usually be carried out, for example, by forming a mixture of the conjugated diene and an allyl type ester of maleic acid, heating the said mixture at a reaction temperature, e. g. a reaction temperature of between about 75° C. and about 125° C., preferably 100° C., and separating the unsaturated ester product by any suitable method, as by fractional distillation of the reaction product under diminished pressure. This condensation reaction may be carried out at atmospheric or superatmospheric pressures and in the presence or absence of a suitable solvent such as benzene or toluene.

As an alternative method of procedure for the preparation of the allyl type methyl-substituted 1,2,3,6-tetrahydrophthalic acid esters of the invention which is applicable in certain cases where the saturated esters corresponding in structure to the desired unsaturated esters are available, the said saturated esters may be converted to a halogen-containing or an hydroxyl-containing derivative which may be dehydrohalogenated or dehydrated to form the desired unsaturated esters.

Thus, in one embodiment of the invention a conjugated diene, e. g. 2-methylpentadiene-1,3, may be mixed with a maleic anhydride and the resulting mixture heated to a temperature of about 100° C. After maintaining the reaction mixture at this temperature for from 3 to 5 hours, the reaction mixture may be distilled under diminished pressure in order to separate the 3,5-dimethyl-1,2,3,6-tetrahydrophthalic acid anhydride product. The anhydride prepared in this fashion may be converted to the diester, e. g. the diallyl ester, by forming a mixture comprising the said anhydride and an unsaturated aliphatic alcohol, e. g. allyl alcohol, together with a small amount of an acid esterification catalyst such as a paratoluene sulfonic acid. This mixture may then be heated at a reflux temperature, preferably under conditions such that water may be removed from the reaction mixture substantially as soon as it is formed, until approximately the theoretical amount of water has been separated from the reaction mixture. The reaction product may then be distilled under diminished pressure, e. g. under a pressure of between about 1 mm. and about 100 mm., thereby separating the ester product from the unreacted starting materials and from any polymeric materials which may have been formed as by-products of the reaction.

In another embodiment a conjugated diene such as pentadiene-1,3 may be mixed with an allyl type ester of maleic acid, e. g. diallyl maleate, and the resulting mixture heated to a temperature of about 100° C. for a reaction time of about 4 hours. The reaction product may then be fractionally distilled in order to obtain the desired 3-methyl-1,2,3,6-tetrahydrophthalic acid ester.

As stated, the invention extends also to the polymers of the herein disclosed unsaturated esters, i. e. the allyl-type esters of the monomethyl and dimethyl-1,2,3,6-tetrahydrophthalic acids. Also included are the copolymers of these compounds with other polymerizable substances. The polymeric materials may be prepared from the monomeric esters by methods suitable for use in the polymerization of such substances, or they may be prepared directly from the raw materials which are used in the production of the monomeric ester by carrying out the reactions under conditions such that the polymer is produced rather than the monomer.

Typical copolymerizable compounds are those containing in the molecule a single polymerizable olefinic linkage

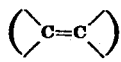

such as styrene, vinyl halides, vinylidene halides, vinyl esters of saturated monocarboxylic acids, methyl acrylate, methyl methacrylate, allyl halides, allyl esters of saturated monocarboxylic acids, etc. Another important group consists of unconjugated polymerizable compounds having in the molecule two or more non-conjugated polymerizable unsaturated linkages such as unsaturated aliphatic polyesters of saturated polybasic acids, polyesters of saturated polyhydric alcohols with unsaturated organic acids, and esters of unsaturated alcohols with unsaturated aliphatic acids. Other polymerizable unsaturated compounds are those containing in the molecule one or more polymerizable organic radicals and one or more inorganic radicals or elements as exemplified by the vinyl, allyl and methallyl esters of phosphoric acid and of the ortho acids of silicon, boron, etc. Another important group of co-polymerizable compounds consists of those having in the molecule two or more, preferably two, conjugated unsaturated polymerizable carbon-to-carbon linkages such as conjugated butadiene, conjugated chlorobutadiene, isoprene, the other conjugated pentadienes, the conjugated hexadienes, their homologs, analogs and suitable substitution products. Particularly valuable copolymers are those of the compounds of the invention with one or more allyl-type polyesters of polycarboxylic acids, particularly allyl-type polyesters of aromatic polycarboxylic acids, e. g. diallyl phthalate and the like. Other valuable copolymers of the preferred class are those with allyl-type polyesters of ethereal oxygen-containing polycarboxylic acids, e. g. diallyl diglycolate.

The compounds of the invention can be polymerized and copolymerized by oxygen-containing polymerization catalysts. Benzoyl peroxide has been found satisfactory for this purpose. Other polymerization catalysts are acetyl peroxide, benzoyl acetyl peroxide, lauryl peroxide, dibutyryl peroxide, succinyl peroxide, sodium peroxide, barium peroxide, tertiary alkyl hydroperoxides, such as tertiary butyl hydroperoxide, peracetic acid, perphthalic acid, sodium peroxide, perborates, persulfates, ozone and oxygen. The compounds can be polymerized in the presence of their own peroxides, or of their ozonides. Another class of polymerization catalysts consists of the di(tertiary alkyl) peroxides, notably di(tertiary butyl) peroxide, as described and claimed in the co-pending application of Vaughan and Rust, Serial No. 481,052, filed March 29, 1943, now U. S. Patent No. 2,426,476, which is a continuation-in-part of their co-pending application Serial No. 474,224, filed January 30, 1943 now U. S. Patent No. 2,395,523. Metals and metallic salts may be used as polymerization catalysts. If desired, mixtures of polymerization catalysts can be used, a suitable mixture being that of benzoyl peroxide and hydrogen peroxide. In some cases it may be desirable to conduct the polymerization in the concurrent presence of both a catalyst and an inhibitor of polymerization. The amount of peroxide catalyst used will ordinarily be between about 0.01% and about 5%, although it is not necessarily limited to this range. In still other cases it may be unnecessary to use any catalyst at all.

Polymerization is usually energized by the application of heat, although both heat and light may be used, and in some cases, light may be sufficient. Temperatures between about 60° C. and about 150° C. are preferred, although higher and lower temperatures can be used. The monomeric compounds can be polymerized in the massive state or as dispersions or solutions. Where the dispersion method is employed, it may be desirable to select a dispersing medium insoluble in the catalyst involved. With certain compounds polymerization can be effected in vapor state. Continuous or discontinuous processes may be used. Atmospheric, reduced, or super-atmospheric pressures may be used. Polymerization may be carried out under a blanket of an inert gas.

The polymerization reaction can be carried to completion without substantial interruption or it can be stopped at any point short of completion. Incomplete polymerization may be used for the production of a syrup comprising a mixture of monomer and polymer which may be further worked and eventually substantially completely polymerized. The syrup may, for instance, be transferred to a mold of any desired configuration and again subjected to polymerization conditions, or it may be used in coating operations, or in impregnating bibulous, e. g. fibrous, material, which in turn may be used in the production of laminates. Unreacted monomer may be separated from its mixture with polymer by solvent extraction, distillation or other methods. The separated polymer may then be worked up in any known or special manner. In the case of many compounds, particularly in the case of the polymerization of compounds having two or more non-conjugated polymerizable unsaturated linkages in the molecule, the separated polymer may be capable of further polymerization.

Polymers and copolymers of the invention can be modified by admixture with other synthetic resins, natural resins, cellulose derivatives, and drying oils. Preferred modifiers are film-forming substances. Examples of synthetic resins in addition to polymers of the polymerizable unsaturated organic compounds illustrated hereinabove are alkyd resins, urea-aldehyde resins, phenol-aldehyde resins and synthetic linear super-polyamides and polyester-amides. There may also be present one or more plasticizers, stabilizers, lubricants, dyes, pigments, or fillers. Where the modifiers do not react with, or otherwise adversely affect, the ingredients of the reaction mixture, they may be added to the monomer or to the partially polymerized material. Where the modifiers are not added to the monomer, they can be incorporated with preformed polymer by grinding, mixing or milling on heated rolls, or by co-precipitation from a common solvent.

The invention is illustrated by the following examples wherein the parts are parts by weight.

*Example I*

3,5-dimethyl 1,2,3,6-tetrahydrophthalic anhydride was prepared by slowly adding about 10 parts of 2-methylpentadiene-1,3 to a solution of about 9 parts of maleic anhydride in about 1 part of benzene. The reaction mixture was heated at about 100° C. for about 2 hours and then distilled. A substantially quantitative yield of 3,5-dimethyl-1,2,3,6-tetrahydrophthalic anhydride, boiling at 122° C. to 130° C. at 0.5 mm. was obtained. The compound distilled as a water-white liquid, having a faint, pleasant odor. On cooling it crystallized to a solid melting at 53° C. to 54° C. The anhydride was easily converted to the acid by heating in water or shaking in dilute alkali and acidifying. The melting point of the acid was 155° C.

A mixture of about 1 part of 3,5-dimethyl-1,2,3,6-tetrahydrophthalic acid anhydride prepared as described above, 1 part of allyl alcohol, 1 part of benzene and a small amount of para-toluene sulfonic acid was heated at reflux temperature in a still equipped with a phase separating head. The water which was formed as a product of the reaction was removed through the phase separating head substantially as soon as it was formed. The heating was continued until approximately the theoretical amount of water had been removed. The reaction mixture was then distilled in order to separate the diallyl 3,5 - dimethyl - 1,2,3,6 - tetrahydrophthalate. This product boiled at 130° C. to 134° C. at 5 mm. It was a water-white, slightly viscous, practically odorless liquid. The saponification value (eq./100 g.) was 0.696 (calculated, 0.719) while the refractive index (R. I. 20/D)) was 1.4922 and the sp. gr. (20/4) was 1.0875.

*Example II*

Diallyl 3-methyl-1,2,3,6-tetrahydrophthalate was prepared as follows: Pentadiene-1,3 was reacted with maleic anhydride, using the procedure for effecting the condensation substantially as described in Example I. This resulted in the formation of the anhydride of 3-methyl-1,2,3,6-tetrahydrophthalic acid. The said anhydride was then reacted with a molar excess of allyl alcohol as described in Example I, to form the desired diallyl ester. This ester boiled at 110° C. to 112° C. at 1.5 to 2.0 mm. Other properties were:

Saponification value (eq./100 g.), 0.748 (calculated, 0.757)
R. I. (20/D), 1.4848
Sp. gr. (20/4), 1.0743

*Example III*

The diallyl ester of 4,5-dimethyl-1,2,3,6-tetrahydrophthalic acid was prepared by reacting 2,3-dimethylbutadiene-1,3 with maleic anhydride and reacting the resulting 4,5-dimethyl-1,2,3,6-tetrahydrophthalic acid anhydride with an excess of allyl alcohol as described in Example I. The ester product had properties as follows:

Boiling point, 121° C. to 125° C. at 1.5 mm.
Saponification value (eq./100 g.), 0.715 (calculated, 0.719)
R. I. (20/D), 1.4870
Sp. gr. (20/4), 1.0829

*Example IV*

Using the procedure described in Example III, diallyl 4-methyl-1,2,3,6-tetrahydrophthalate was prepared from 2-methylbutadiene-1,3, maleic anhydride and allyl alcohol. It had the following properties:

Boiling point, 139° C. to 141° C. at 2.5 mm.
Saponification value (eq./100 g.), 0.750 (calculated, 0.757)
R. I. (20/D), 1.4873
Sp. gr. (20/4), 1.0805

*Example V*

Dimethallyl 3,5-dimethyl-1,2,3,6-tetrahydrophthalate is prepared from 2-methylpentadiene-1,3, maleic anhydride, and methallyl alcohol, using substantially the same procedure as is outlined in Example I.

*Example VI*

The monoallyl ester of 3,5-dimethyl-1,2,3,6-tetrahydrophthalate is prepared by condensing monoallyl maleate with 2-methylpentadiene-1,3.

Example VII

The polymer of diallyl 3,5-dimethyl-1,2,3,6-tetrahydrophthalate was prepared by adding about 2% by weight of benzoyl peroxide to the monomeric ester and heating the resulting mixture for 3 hours at 50° C., then for 84 hours at 75° C., and then for 24 hours at 90° C. An additional 4% of benzoyl peroxide was then added, and the mixture thus formed heated for 81 hours at 70° C. The polymeric product was obtained in the form of a light colored viscous syrup which was readily soluble in hydrocarbon solvents. A benzene solution air-dried to form a hard clear film.

Example VIII

Diallyl-1,2,3,6-tetrahydrophthalate was polymerized by heating in the presence of benzoyl peroxide, using the general procedure described in Example VII. Upon prolonged heating a hard yellow polymer was obtained. This contrasts with the liquid polymers which were obtained by polymerization of the methyl-substituted phthalic acid esters of the invention.

Example IX

Monomeric diallyl 3-methyl-1,2,3,6-tetrahydrophthalate was polymerized to a heavy viscous syrup, using the same procedure as is outline in Example VII.

Example X

Diallyl 4-methyl-1,2,3,6-tetrahydrophthalate was converted to a viscous polymer by heating with benzoyl peroxide as described in Example VII.

Example XI

The procedure employed in Example VII was used to prepare polymeric diallyl 4,5-dimethyl-1,2,3,6-tetrahydrophthalate. This polymer was likewise a clear viscous substance which did not harden, even upon prolonged heating in the presence of the polymerization catalyst.

We claim as our invention:

1. A normally liquid polymer of diallyl 3-methyl-1,2,3,6-tetrahydrophthalate.
2. A normally liquid polymer of diallyl 3,5-dimethyl-1,2,3,6-tetrahydrophthalate.
3. A normally liquid polymer of diallyl 3,4-dimethyl-1,2,3,6-tetrahydrophthalate.
4. A normally liquid polymer of the diallyl ester of a methyl-substituted 1,2,3,6-tetrahydrophthalic acid which contains not more than 2 methyl groups substituted upon the nuclear carbon atoms.

RUPERT C. MORRIS.
ROBERT M. HOROWITZ.
ALVA V. SNIDER.

REFERENCES CITED

The following references are of record in the file of this patent:

UNITED STATES PATENTS

| Number | Name | Date |
|---|---|---|
| 1,824,069 | Brooks | Sept. 22, 1931 |
| 2,066,331 | Carothers et al. | Jan. 5, 1937 |
| 2,221,663 | Rothrock | Nov. 12, 1940 |
| 2,264,429 | Bergmann | Dec. 2, 1941 |
| 2,275,034 | Moyle | Mar. 3, 1942 |
| 2,275,383 | Soday | Mar. 3, 1942 |
| 2,275,385 | Soday | Mar. 3, 1942 |
| 2,359,038 | Hopff et al. | Sept. 26, 1944 |
| 2,384,568 | Semon | Sept. 11, 1945 |